United States Patent
Goransson et al.

(10) Patent No.: US 8,917,656 B2
(45) Date of Patent: Dec. 23, 2014

(54) RECOMMENDING A TRANSMISSION MODE FOR A MIMO-SUPPORTING UE

(75) Inventors: Bo Goransson, Sollentuna (SE); Johan Bergman, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 826 days.

(21) Appl. No.: 12/597,766

(22) PCT Filed: Jan. 21, 2008

(86) PCT No.: PCT/SE2008/050060
§ 371 (c)(1),
(2), (4) Date: Oct. 27, 2009

(87) PCT Pub. No.: WO2008/133576
PCT Pub. Date: Nov. 6, 2008

(65) Prior Publication Data
US 2010/0118784 A1   May 13, 2010

(30) Foreign Application Priority Data
Apr. 30, 2007   (SE) ..................... 0701041

(51) Int. Cl.
*H04W 4/00* (2009.01)
*H04K 1/10* (2006.01)
*H04B 7/06* (2006.01)
*H04B 7/08* (2006.01)
*H04L 1/00* (2006.01)
*H04L 1/06* (2006.01)
*H04B 7/04* (2006.01)

(52) U.S. Cl.
CPC ............ *H04B 7/0689* (2013.01); *H04B 7/0871* (2013.01); *H04L 1/0001* (2013.01); *H04L 1/0025* (2013.01); *H04L 1/06* (2013.01); *H04L 1/0026* (2013.01); *H04B 7/0404* (2013.01); *H04B 7/0678* (2013.01)
USPC .......................................... 370/328; 375/260

(58) Field of Classification Search
CPC .................................................. H04W 28/021
USPC .......................................................... 370/328
See application file for complete search history.

(56) References Cited

U.S. PATENT DOCUMENTS

| | | | |
|---|---|---|---|
| 7,248,638 B1 * | 7/2007 | Banister | 375/267 |
| 2004/0095907 A1 * | 5/2004 | Agee et al. | 370/334 |
| 2004/0266472 A1 * | 12/2004 | Ben Rached et al. | 455/522 |
| 2005/0007971 A1 * | 1/2005 | Jeong et al. | 370/312 |
| 2005/0111395 A1 * | 5/2005 | Hwang et al. | 370/313 |
| 2005/0153715 A1 * | 7/2005 | Hwang et al. | 455/458 |
| 2005/0237923 A1 * | 10/2005 | Balakrishnan et al. | 370/208 |
| 2005/0249159 A1 * | 11/2005 | Abraham et al. | 370/329 |

(Continued)

FOREIGN PATENT DOCUMENTS

| | | | |
|---|---|---|---|
| EP | 1643661 A2 | 4/2006 | |
| WO | 2004/086712 A2 | 10/2004 | |

*Primary Examiner* — Gerald Smarth
(74) *Attorney, Agent, or Firm* — Coats and Bennett, PLLC

(57) ABSTRACT

The present invention relates to methods, a network controller unit (120A, 120B) and a network unit 110A, 110) in a wireless communications system (100). According to the present invention, the transmission/reception mode to be used by a user equipment UE (130A, 130B) can be decided in the network controller unit (120A, 120B) based on reports transmitted from the network unit (110A, 110B). The reports include a recommendation on the mode to be used by the UE (130A, 130B).

34 Claims, 3 Drawing Sheets

(56) References Cited

U.S. PATENT DOCUMENTS

| | | | |
|---|---|---|---|
| 2005/0270978 A1* | 12/2005 | Haines | 370/235 |
| 2006/0046662 A1 | 3/2006 | Moulsley et al. | |
| 2006/0068712 A1* | 3/2006 | Kroboth et al. | 455/67.11 |
| 2006/0198340 A1* | 9/2006 | Murata et al. | 370/331 |
| 2008/0037501 A1* | 2/2008 | Ali et al. | 370/342 |
| 2008/0069031 A1* | 3/2008 | Zhang et al. | 370/328 |

* cited by examiner

RECOMMENDING A TRANSMISSION MODE FOR A MIMO-SUPPORTING UE

TECHNICAL FIELD

The present invention relates generally to the field of wireless communications, and, more particularly, to a method, a network unit and a network controller unit for operating transmission/reception modes for user equipments in a wireless communications system.

BACKGROUND

In the current UMTS (universal mobile telecommunication systems) specifications or the current WCDMA (wideband code division multiplexing access) specifications Release 7, MIMO (multiple input multiple output) antenna systems are introduced to enable high data rates to be achieved, especially in the downlink. In principle, the peak data rate in a WCDMA wireless communications system incorporating high-speed packet access (HSPA) is doubled when using MIMO compared to previous releases. HSPA is a new protocol for data transmissions and is a combination of HSDPA (high-speed downlink packet access) in the downlink and HSUPA (high-speed uplink packet access) in the uplink, both of which are specified in 3GPP Release 5/6. HSPA can provide data rates up to 14 Mbps in the downlink and 5.8 Mbps in the uplink. If MIMO technology is incorporated in HSPA, data rates up to 28 Mbps in the downlink are provided. The faster data speeds made possible with HSPA evolution will thus enhance the user experience for services like Mobile Broadband and Mobile TV while reducing the production cost per gigabyte.

HSPA and MIMO can be implemented in user equipments (UE) such as mobile phones or wireless terminals, as well as in network nodes such as a radio base station or a NodeB. In order to support MIMO technology in HSPA, control channels in the uplink and in the downlink have been modified. For the downlink, the downlink high-speed shared control channel (DL HS-SCCH) has been extended to incorporate the necessary information for transmitting up to two transport blocks of data simultaneously. Similarly, for the uplink, the high-speed dedicated physical control channel (UL HS-DPCCH) has been extended to incorporate channel quality indicators (CQI) for up to two streams in addition to pre-coding information. As well known in the art, a CQI is a measurement of the communication quality of wireless channels. CQI can be a value (or values) representing a measure of channel quality for a given channel realization. Typically, a high value CQI is indicative of a channel with high quality and vice versa. A CQI for a channel can be computed by making use of performance metric, such as a signal-to-noise ratio (SNR) or signal-to-interference plus noise ratio (SINR).

Due to the extension of the MIMO control channels, a coverage area for a terminal in a MIMO transmission/reception mode is somewhat smaller than that for a terminal in a non-MIMO mode. This is because of the larger payload in the MIMO control channels. Alternatively, more output power is required/needed for control channels to retain the same coverage when a terminal is entering a transmission/reception MIMO mode.

In the US patent application publication US 2006/0046662, a method and a system are provided for mitigating the effect of differing radio link qualities on the communication system wherein HSDPA and MIMO technology are implemented. In this prior art, a MIMO capable UE having a plurality of antennas can monitor its radio environment and send information about its radio environment to a radio base station (or a NodeB). The radio base station then adapts itself and the UE, in terms of receiver resources (such as the number of receiver antennas to be used) to cope with the varying radio conditions. The UE can also recommend to the base station how it should adapt itself, or it can also recommend that the base station uses a particular subset of antennas for transmitting data.

A drawback with the solution described above is that if the radio base station is to make a decision on how many transmit antennas to use, it would need to know all of the channel coefficients (including those of the interferer(s)) as well as the capability of the mobile terminal to cancel interference. This will therefore require a significant signalling load in the radio spectrum. A solution to that problem would be to let the mobile terminal make all or some of the decisions in order to reduce the signalling load. However, this would still require a significant amount of computational resources in the mobile terminal and power consumption at a mobile terminal or at the UE is a very important factor especially for MIMO capable mobile terminals (UEs).

SUMMARY

It is thus an object of the embodiments of the present invention to address the above mentioned problems and to provide methods, a network unit and a network controller unit that allow an efficient operation of transmission/reception modes for a user equipment (UE) in a wireless communications system. In particular, it is an object of the embodiments of the present invention to provide a solution that allows a radio network controller unit be aware of situations where the UE is coverage limited and based on e.g. the radio/propagation conditions and the output power limitations, to operate the UE in the most appropriate mode to a larger extent, i.e. in a MIMO mode only in scenarios where MIMO operation is useful or in non-MIMO mode when MIMO operation is not useful or to let the UE keep its current transmission/reception mode. The decision making is thus performed by the network controller unit in the network side of the wireless communications system thus relieving the base station (or the NodeB) and the UE from having to spend significant radio resources and/or computational resources in making decision(s).

According to a first aspect of an embodiment of the present invention, the above stated problem is solved by means of a method for use in a network controller unit of a wireless communications system comprising at least one UE capable of communicating with a network unit e.g. a radio base station or a NodeB. Both the UE and the network unit being configured to have one or several receive and/or transmit antennas. According to the embodiment of the present invention, the method comprises: receiving from the network unit at least one report indicating a recommendation on a transmission/reception mode to be used by the UE; deciding on a transmission/reception mode to be used by the UE; informing the network unit, in a signalling message, a decision on a transmission/reception mode to be used by the UE; and informing from the network unit to the UE, in the signalling message, the decision made by the network controller unit.

According to another aspect of another embodiment of the present invention, the above stated problem is solved by means of a network controller unit e.g. a radio network controller unit (RNC) in a wireless communications system comprising at least one UE capable of communicating with a network unit in the system; both the network unit and the UE being configured to have one or several receive and/or transmit antennas. The network controller unit is, according to the present embodiment of the invention, configured for receiving from the network unit at least one report indicating a recommendation on a transmission/reception mode to be used by the UE; and further configured for deciding on a transmission/reception mode to be used by the UE; and further configured for informing the network unit, in a signalling message, on the decision made by the network controller unit; and informing the UE in the signalling message, on the decision made.

According to another aspect of yet another embodiment of the present invention, the above stated problem is solved by means of a method for use in a network unit of a wireless communication network comprising at least one user equipment capable of communicating with the network unit, the UE and the network unit being configured to have one or several receive and/or transmit antennas. The method comprises: transmitting to a network controller unit at least one report indicating a recommendation on a transmission/reception mode to be used by the UE in the network; receiving from the network controller unit, in a signalling message, a decision on a transmission/reception mode to be used by the UE and informing the UE in the signalling message, the decision made by the network controller unit.

According to another aspect of another embodiment of the present invention, the above stated problem is solved by means of a network unit e.g. a radio base station or a NodeB, of a wireless communications system, configured to communicate with at least one UE. The UE and the network unit having at least one receive and/or transmit antennas. The network unit, according to the present embodiment of the present invention, comprises a communication interface configured for transmitting to a network controller unit at least one report indicating a recommendation on transmission/reception mode to be used by the UE; and further configured for receiving, in a signalling message, from the network controller unit, a decision concerning a transmission/reception mode to be used by the UE; and further configured to inform, in the signalling message, the UE, on the decision made by the network controller unit.

According to yet another aspect of another embodiment of the present invention, the above stated problem is solved by means of a wireless communications system comprising the network unit and the controller unit described above.

An advantage with the present invention is that the network controller unit in the network is able to operate the UE in the most appropriate mode by taking the decision on the mode to be used.

Another advantage with the present invention is that it relieves the network unit e.g. the radio base station or the NodeB and the UE from having to spend significant radio resources and/or computational resources in making any decision(s) concerning the UE's mode operation.

A further advantage with the present invention is that the interference in the network is reduced since unnecessary increase of the power needed for control channels to retain the same coverage using a constant transmission/reception mode is obviated. This is because of the adaptation of the transmission/mode depending on e.g. the channel quality of the radio channel. This will also lead to better performance.

The present invention will now be described in more detail by means of several embodiments and with reference to the accompanying drawings. However, the following drawings are illustrative only, and various modifications and changes may be made in the specific embodiments illustrated, as described within the scope of the appended claims.

DETAILED DESCRIPTION

In the following description, for purposes of explanation and not limitation, specific details are set forth such as particular architectures, scenarios, techniques, etc. in order to provide thorough understanding of the present invention. However, it will be apparent from the person skilled in the art that the present invention and its embodiments may be practiced in other embodiments that depart from these specific details.

The different embodiments of the present invention are described herein by way of reference to particular example scenarios. In particular the invention is described in a non-limiting general context in relation to a WCDMA cellular radio communications network that incorporates high-speed packet access (HSPA) and multiple input multiple output (MIMO) technology to be utilized together with HSPA, and more particularly to a method of operating a UE in the most appropriate transmission/reception mode when taking e.g. propagation conditions and output power limitations into account. The present invention also provides a network unit and a network controller unit that are both involved in the above mentioned method. It should be noted that the present invention is not restricted to HSPA and MIMO technology, but can be applicable in other wireless systems such as WiMAX (worldwide interoperability for microwave access), or LTE (long term evolution). Moreover, the present invention is not limited to MIMO, but may be employed in other systems, such as SIMO (single input multiple input) systems and/or MISO (multiple input single output) systems, etc.

Figure 1:
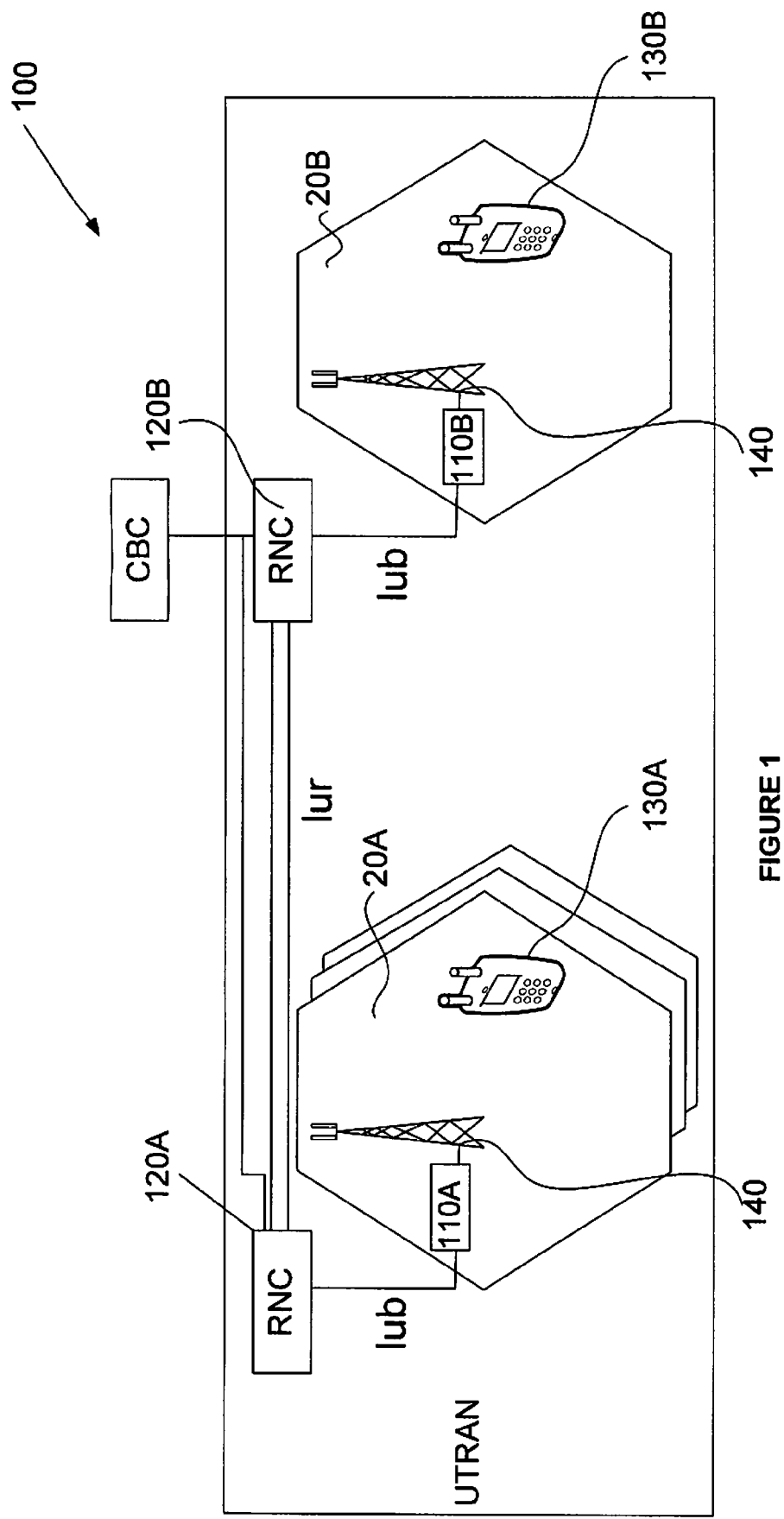
FIG. 1 is a block diagram illustrating an example of a wireless communications network system to which the present invention can be applied.

FIG. 1 illustrates an example of a simplified WCDMA cellular radio communications network system 100 comprising two cells 20A and 20B and two UEs 130A and 130B each served by its own network unit i.e. radio base station or NodeB 110A and 110B respectively. As shown in FIG. 1, a first radio network controller unit (RNC) 120A is connected to NodeB 110A, and a second RNC 120B is connected to NodeB 110B. RNC 120A and RNC 120B are also connected to each other. As depicted, UEs 130A and 130A are capable in communicating with NodeBs 110A and 110B using one or several receiver/transmitter antennas according to the MIMO technology. In addition, both NodeB 110A and NodeB 110B are equipped with one or several MIMO antennas 140 for communication with UEs in the wireless network system 100. As well known in the art, the communication interface between the RNC and the NodeB is the Iub whereas the communication interface between RNCs is the Iur.

Since the UEs 130A and 130B can move freely in the network 100, the radio conditions and the propagation conditions may vary depending on e.g. the distance between the UE and the NodeB in addition to the power used by a UE to communicate with NodeB. It should be noted that the radio conditions may vary depending on other factors other that the movement of the UEs.

According to an exemplary embodiment of the present invention, the MIMO capable UE (130A or 130B) can be put into non-MIMO transmission/reception mode by higher layer signalling such as Layer 3 signalling (L3) i.e. the UE can be ordered to switch off its MIMO transmission/reception mode. This can occur when the network recognizes that the UE (130A or 130B) starts becoming coverage limited or if the received signal to interference noise ratio (SINR) is low (or very low). In such scenarios and according to an exemplary embodiment of the present invention, the NodeB (110A or 110B) can transmit to its RNC (120A or 120B) a report indicating a recommendation that the UE should be in a non-MIMO transmission/reception mode. The report can be sent from the NodeB to the RNC using the Iub interface. The report may further be sent by the RNC 120A to another RNC 120B using the Iur Interface. This could occur e.g. when a UE needs to move from a first cell to a second cell in e.g. a roaming scenario or in a handover scenario. The report or reports may be transmitted to the RNC using different reporting mechanisms. As an example and according to an exemplary embodiment of the present invention, the report can be transmitted periodically with one report every predetermined time period×ms. According to another exemplary embodiment of the present invention, the report(s) can be event-triggered i.e. transmitted every time some criteria are fulfilled in the NodeB. As an example, the NodeB can base its report on channel quality measurement (CQI) results performed and provided by the UE and/or can base its report on channel rank estimates and/or SINR estimates and/or output power levels or any other direct or indirect indicators of the usefulness of MIMO transmission/reception mode for the UE in question. According to yet another exemplary embodiment of the present invention, the report can be triggered by polls sent from the RNC to NodeB every time some criteria are fulfilled in the RNC, for example criteria based on measurement results provided by NodeB or by another RNC which are part of the UMTS radio access network (UTRAN) or provided by the UE. The RNC can then base its decision on the measurement results provided by the NodeB or by another RNC, or by the UE.

As mentioned above, the report(s) transmitted from the NodeB to the RNC comprises a recommendation on a transmission/reception mode to be used by the UE. According to an exemplary embodiment of the present invention, the recommendation could be that the UE should be in MIMO mode; or could be that the UE should be in non-MIMO mode; or could be that the UE should keep it current mode. When the RNC receives a recommendation report from the NodeB it has to select a transmission mode to be used by the UE.

According to another exemplary embodiment of the present invention, the recommendation comprises a scalar value defining a transmission/reception mode to be used by the UE. If the scalar value is positive, the recommendation indicates that the UE should be in MIMO mode. The larger the positive value of the scalar value, the stronger the recommendation. If the scalar value is negative, the recommendation indicates that the UE is not to use a MIMO transmission/reception mode. The larger the negative value of the scalar value, the stronger the recommendation. If the value is zero then the recommendation indicates that the UE should keep it transmission/reception mode.

According to another exemplary embodiment of the present invention, the recommendation comprises the number of antennas to be used by the UE. As an example, if the UE supports N×N antennas where e.g. N=4, a recommendation could be that the UE should be in a 2×2 transmission/reception MIMO mode; or that the UE should be in a 4×4 transmission/reception MIMO mode; or that the UE should not be in MIMO mode i.e. should only use one antenna for transmission/reception.

Therefore, the present invention and its exemplary embodiments can be applicable in a future 3GPP release that defines the implementation of more than one MIMO mode e.g. different modes depending on the number of transmit/receive antennas. The recommendation indicated by the NodeB to the RNC can thus cover the above cases where N×N antennas can be used.

As mentioned above, the RNC upon receiving a report indicating a recommendation on a transmission/reception mode to be used by the UE, it has to decide on an appropriate mode for the UE to use. As the RNC decides on which mode the UE should use, it will inform the NodeB in a signalling message. According to an embodiment of the present invention, the RNC signals its decision via a layer 3 (L3) signalling message that includes NBAP (NodeB application part) signalling to NodeB and RRC (radio resource control) signalling to the UE.

It should be noted that the RNC does not necessarily need to follow the recommendations from NodeB when deciding on a transmission/reception mode to be used by the UE. However, since the NodeB is better aware of the coverage/capacity in the cell it serves, the RNC preferably needs to take the recommendations received from the NodeB into account. Thus, each MIMO capable UE can be put into a transmission/reception mode (e.g. into a MIMO mode) by e.g. higher layer signalling. As an example, the RNC can send a MIMO on/off command to the UE and NodeB when the recommendation received from NodeB indicates that the UE is becoming e.g. coverage limited due to a very low SINR, or due to very bad channel conditions reported by the UE to NodeB via CQIs, or if the channel rank changes or other factors. As an example, if the RNC decides that the UE should turn off it MIMO mode i.e. the UE should be in a non-MIMO transmission/reception mode, an ordinary HS-SCCH can be used, since this channel requires less power than the corresponding extended MIMO HS-SCCH channel, thus leading to better performance in the network. It should be noted that the RNC can at call setup, cell changes etc. (or at any time) issue a MIMO on/off command to the UE and when this command is acknowledged by the NodeB, the NodeB can start using the MIMO HS-SCCH and then transmit the HS-PDSCH in MIMO mode. However, by using the different exemplary embodiments of the present invention, the RNC bases it decisions on the reports received from the NodeB.

Figure 2:
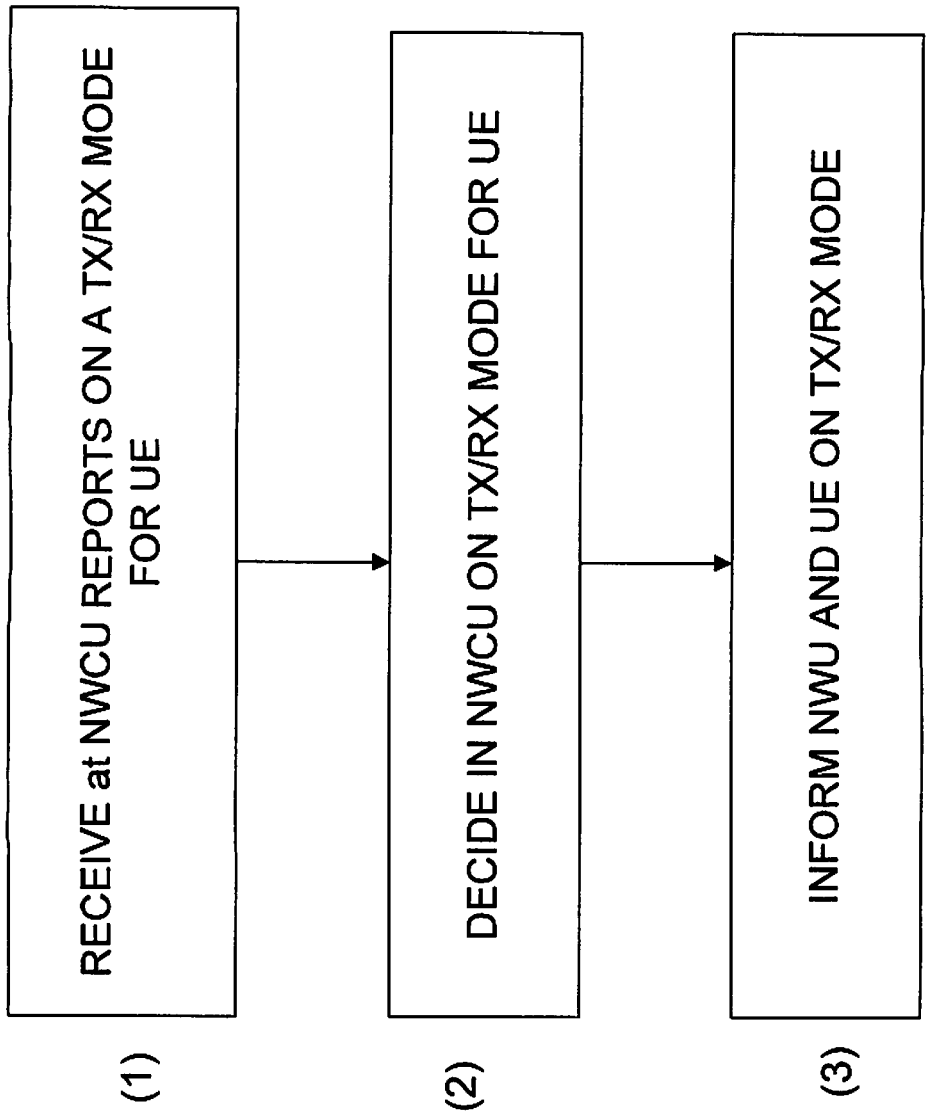
FIG. 2 illustrates a flowchart of a method according to exemplary embodiments of the present invention.

Referring to FIG. 2, there is illustrated a flowchart of a method for use in the network controller unit according to the previously described exemplary embodiments of the present invention. As shown, the method starts in step (1) when a network controller unit (NWCU) (e.g. a RNC) receives at least one report indicating a recommendation on a transmission/reception mode (TX/RX mode) to be used by a UE. The report(s) are transmitted from a network unit (NWU).

At step (2), the network controller unit (NWCU) takes a decision on a transmission/reception mode to be used by the UE.

At step (3) the network controller unit (NWCU) informs the network unit (NWU) and the UE, in a signalling message (e.g. L3 signalling), a decision made by the NWCU.

Figure 3:
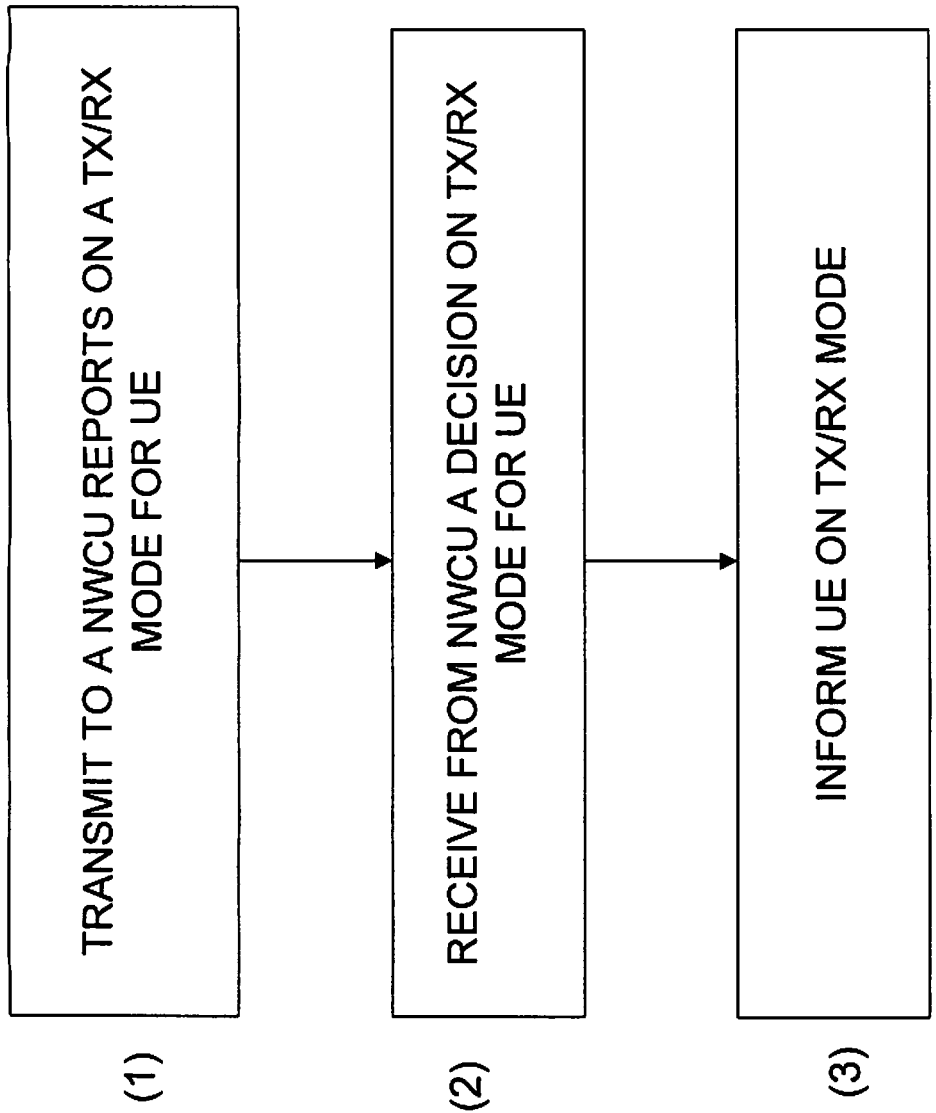
FIG. 3 illustrates another flowchart of a method according to other exemplary embodiments of the present invention.

Referring to FIG. 3, there is illustrated a flowchart of a method for use in a network unit according to the previously described exemplary embodiments of the present invention. As shown, the method starts in step (1) when the network unit (NWU) (e.g. a radio base station or a NodeB) transmits to a network controller unit (NWCU) (e.g. a RNC) at least one report indicating a recommendation on a transmission/reception mode (TX/RX mode) to be used by a UE.

At step (2), the network unit (NWU) receives a decision on a transmission/reception mode to be used by the UE.

At step (3) the network unit (NWU) informs the UE on the decision made by the NWCU concerning a transmission/reception mode to be used.

While the invention has been described in terms of several preferred embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the present invention.

The invention claimed is:

1. A method for use in a radio network controller of a wireless communication network that comprises at least one user equipment (UE) capable of communicating with a network unit, said UE and said network unit being configured to have one or several receive and/or transmit antennas, said method comprising:
    receiving from said network unit at least one report indicating a recommendation on a transmission/reception mode to be used by said UE in said network, wherein said recommendation is based on at least one of: signal to interference and noise ratio (SINR) estimates, channel rank estimates, and output power levels;
    deciding on a transmission/reception mode to be used by said UE by selecting between a non-multiple input multiple output (MIMO mode and a multiple input multiple output (MIMO mode;
    informing said network unit, in a signaling message, a decision on the selected transmission/reception mode to be used by said UE, wherein said network unit informs said UE of the decision, based on said signaling message, and wherein said signaling message is a Layer 3 (L3) signaling message comprising a NodeB Application Part (NBAP) signaling message from said network control unit to said network unit and a Radio Resource Control (RRC) signaling message for sending from said network unit to said UE.

2. The method of claim 1, wherein the recommendation comprises a number of transmit/receive antennas to be used by said UE.

3. The method of claim 1, wherein said step of deciding further comprises deciding a transmission/reception mode to be used by said UE based on said received report.

4. The method of claim 3, wherein the report is received via an Iub interface between the radio network controller and the network unit.

5. The method of claim 3, wherein the report is received via at least one of an Iub interface between the radio network controller and the network unit, and an Iur interface between said radio network controller and another radio network controller.

6. The method of claim 1, further comprising receiving the reports periodically, with one such report received every predetermined time period.

7. The method of claim 1, further comprising receiving the report responsive to some criteria being fulfilled in said network unit, wherein said criteria are based on channel quality indications (CQIs) received at said network unit from said UE.

8. The method of claim 1, wherein the reception of said report is triggered by polls sent from the radio network controller to said network unit every time some criteria are fulfilled in said radio network controller, said criteria are based on measurement results provided by said UE or by said network unit or by another radio network controller.

9. The method of claim 1, wherein said UE is configured to support multiple input multiple output (MIMO) antennas.

10. The method of claim 1, further comprising ordering said network unit to provide the radio network controller with a recommendation regarding a transmission/reception MIMO mode for said UE, when said UE is residing in a MIMO capable cell.

11. The method of claim 10, wherein said recommendation comprises an indication that said UE should be in a MIMO mode or that said UE should be in non-MIMO mode or that said UE should keep its current transmission/reception mode.

12. The method of claim 10, wherein said recommendation comprises a scalar value indicating a transmission/reception mode to be used by said UE and wherein if said value is positive, the scalar value indicates that said UE should be in a MIMO mode; or if said value is negative, the scalar value indicates that said UE should be in a non-MIMO mode; or if said value is equal to zero, the scalar value indicates that said UE should keep its current transmission/reception mode.

13. A radio network controller of a wireless communications network that comprises at least one user equipment (UE) capable of communicating with a network unit, said UE and said network unit being configured to have one or several receive and/or transmit antennas, said radio network controller comprising:
    a communication interface configured for receiving, from said network unit, at least one report indicating a recommendation on a transmission/reception mode to be used by said UE in said network, wherein said recommendation is based on at least one of: signal to interference and noise ratio (SINR) estimates, channel rank estimates, and output power levels; and
    a decision circuit configured to make a decision on the transmission/reception mode to be used by said UE by selecting between a non-multiple input multiple output (MIMO) mode and a multiple input multiple output (MIMO) mode;
    said communication interface further configured for sending to said network unit, a signaling message indicating said decision to said network unit and said UE, and wherein said signaling message is a Layer 3 (L3) signaling message comprising a NodeB Application Part (NBAP) signaling message from said network control unit to said network unit and a Radio Resource Control (RRC) signaling message for sending from said network unit to said UE.

14. The radio network controller of claim 13, wherein the radio network controller is further configured to decide on said transmission/reception mode based on the received report.

15. The radio network controller of claim 13, wherein the radio network controller is further configured to send polls to said network unit every time some criteria are fulfilled in said radio network controller, wherein said criteria are based on measurement results provided by said UE or by said network unit or by another radio network controller.

16. The radio network controller of claim 13, wherein the radio network controller is further configured, if said UE is capable of supporting multiple input multiple output (MIMO) antennas and resides in a MIMO capable cell, to order said network unit to provide the radio network controller with a recommendation regarding a transmission/reception MIMO mode for the UE.

17. A method for use in a network unit of a wireless communication network that comprises at least one user equipment (UE) capable of communicating with said network unit, said UE and said network unit being configured to have one or several receive and/or transmit antennas, said method comprising:
    transmitting to a radio network controller, at least one report indicating a recommendation on a transmission/ reception mode to be used by said UE in said network, wherein said recommendation is based on at least one of signal to interference and noise ratio (SINR) estimates, channel rank estimates, and output power levels;

receiving from said radio network controller, in a signaling message, a decision on a transmission/reception mode to be used by said UE, said decision comprising a transmission/reception mode selected between a non-multiple input multiple output (MIMO) mode and a multiple input multiple output (MIMO) mode, wherein said signaling message is a Layer 3 (L3) signaling message comprising a NodeB Application Part (NBAP) signaling message received from said network control unit to said network unit, and an Radio Resource Control (RRC) signaling message that is transmitted from said network unit to said UE; and informing said UE, based on said signaling message, said decision made by said radio network controller.

18. The method of claim 17, wherein the step of transmitting comprises transmitting said report via a Iub interface between the network unit and the radio network controller and wherein said recommendation comprises a number of transmit/receive antennas to be used by said UE.

19. The method of claim 17, further comprising transmitting said reports periodically, with one such report transmitted every predetermined time period.

20. The method of claim 17, further comprising transmitting the report every time some criteria are fulfilled in said network unit, wherein said criteria are based on channel quality indications (CQIs) received at said network unit from said UE.

21. The method of claim 17, further comprising transmitting the report responsive to receiving polls from the radio network controller, which polls every time some criteria are fulfilled in said radio network controller, said criteria are based on measurement results provided by said UE or by said network unit.

22. The method of claim 17, wherein said UE is configured to support multiple input multiple output (MIMO) antennas.

23. The method of claim 22, further comprising, when said UE is residing in a MIMO capable cell, providing said radio network controller with a recommendation regarding a transmission/reception MIMO mode for said UE responsive to receiving an order from the radio network controller.

24. The method of claim 23, wherein said recommendation comprises an indication that said UE should be in a MIMO mode or that said UE should be in non-MIMO mode or that said UE should keep its current transmission/reception mode.

25. The method of claim 23, wherein said recommendation comprises a scalar value indicating a transmission/reception mode to be used by said UE and wherein if said value is positive, said scalar value indicates that the UE should be in a MIMO mode; or if said value is negative, said scalar value indicates that said UE should be in a non-MIMO mode; or if said value is equal to zero, said scalar value indicates that said UE should keep its current transmission/reception mode.

26. A network unit in a wireless communications network, said network unit configured to communicate with at least one user equipment (UE), said network unit and said UE each having at least one receive and/or transmit antennas, said network unit comprising:

a communication interface configured for transmitting to a radio network controller at least one report indicating a recommendation on a transmission/reception mode to be used by said UE in said network, wherein said recommendation is based on at least one of signal to interference and noise ratio (SINR) estimates, channel rank estimates, and output power levels, and further configured for receiving from said radio network controller in a signaling message, a decision made by said radio network controller concerning a transmission/reception mode to be used by said UE, said decision comprising a transmission/reception mode selected between a non-multiple input multiple output (MIMO mode and a multiple input multiple output (MIMO mode, wherein said signaling message is a Layer 3 (L3) signaling message comprising a NodeB Application Part (NBAP) signaling message received from said network control unit to said network unit, and an Radio Resource Control (RRC) signaling message that is transmitted from said network unit to said UE; and a signaling circuit for informing said UE, according to said signaling message, said decision made by said radio network controller.

27. The network unit of claim 26, wherein said recommendation comprises a number of transmit/receive antennas to be used by said UE.

28. The network unit of claim 26, wherein said report is transmitted via an Iub interface between the network unit and the radio network controller.

29. The network unit of claim 26, wherein the network unit is configured to transmit the report periodically, with one such report transmitted every predetermined time period.

30. The network unit of claim 26, wherein the network unit is configured to transmit the report responsive to some criteria being fulfilled, wherein said criteria are based on channel quality indications (CQIs) received from said UE.

31. The network unit of claim 26, wherein the network unit is configured to transmit the report responsive to receiving a poll from said radio network controller, wherein the radio network controller polls the network unit every time some criteria are fulfilled in said radio network controller, said criteria based on measurement results received by said UE or sent to said radio network controller.

32. The network unit of claim 26, wherein, if said UE is capable of supporting multiple input multiple output (MIMO) antennas and resides in a MIMO capable cell, the network unit is configured to provide a recommendation regarding a transmission/reception MIMO mode for the UE to said radio network controller.

33. The network unit of claim 32, wherein said recommendation comprises and indication that said UE should be in a MIMO mode or that said UE should be in non-MIMO mode or that said UE should keep its current transmission/reception mode.

34. The network unit of claim 32, wherein said recommendation comprises a scalar value indicating a transmission/reception mode to be used by said UE and wherein if said value is positive, the scalar value indicates that said UE should be in a MIMO mode; or if said value is negative, the scalar value indicates that said UE should be in a non-MIMO mode; or if said value is equal to zero, the scalar value indicates that said UE should keep its current transmission/reception mode.

* * * * *

UNITED STATES PATENT AND TRADEMARK OFFICE
CERTIFICATE OF CORRECTION

| | | |
|---|---|---|
| PATENT NO. | : 8,917,656 B2 | Page 1 of 1 |
| APPLICATION NO. | : 12/597766 | |
| DATED | : December 23, 2014 | |
| INVENTOR(S) | : Göransson et al. | |

It is certified that error appears in the above-identified patent and that said Letters Patent is hereby corrected as shown below:

On the Title Page, in item (12), under "United States Patent", in Column 1, Line 1, delete "Goransson" and insert -- Göransson --, therefor.

On the Title Page, in item (75), under "Inventors", in Column 1, Line 1, delete "Goransson," and insert -- Göransson, --, therefor.

In the Specification

In Column 5, Line 6, delete "lub interface." and insert -- Iub interface. --, therefor.

In Column 5, Line 8, delete "lur Interface." and insert -- Iub interface. --, therefor.

In the Claims

In Column 7, Line 24, in Claim 1, delete "(MIMO mode" and insert -- (MIMO) mode --, therefor.

In Column 7, Line 25, in Claim 1, delete "(MIMO" and insert -- (MIMO) --, therefor.

In Column 7, Line 43, in Claim 4, delete "Tub" and insert -- Iub --, therefor.

In Column 7, Line 47, in Claim 5, delete "lur" and insert -- Iur --, therefor.

In Column 10, Line 10, in Claim 26, delete "(MIMO mode" and insert -- (MIMO) mode --, therefor.

In Column 10, Line 11, in Claim 26, delete "(MIMO" and insert -- (MIMO) --, therefor.

Signed and Sealed this
Twenty-first Day of July, 2015

Michelle K. Lee
*Director of the United States Patent and Trademark Office*